United States Patent
Kobata et al.

(10) Patent No.: US 6,696,539 B2
(45) Date of Patent: Feb. 24, 2004

(54) BLOCKED ISOCYANATE GROUP-CONTAINING RESIN COMPOSITION AND THERMOSETTING COMPOSITION CONTAINING THE SAME

(75) Inventors: Masami Kobata, Kanagawa (JP); Hiromi Harakawa, Kanagawa (JP); Hidekazu Ishii, Kanagawa (JP)

(73) Assignee: Kansai Paint Co., Ltd, Kanagawa (JP)

( * ) Notice: Subject to any disclaimer, the term of this patent is extended or adjusted under 35 U.S.C. 154(b) by 22 days.

(21) Appl. No.: 10/077,934

(22) Filed: Feb. 20, 2002

(65) Prior Publication Data

US 2002/0165335 A1 Nov. 7, 2002

(30) Foreign Application Priority Data

Feb. 21, 2001 (JP) ............................................ 2001-44517
Dec. 3, 2001 (JP) ......................................... 2001-368312

(51) Int. Cl.$^7$ .............................................. C08G 18/80
(52) U.S. Cl. ........................... 528/45; 528/75; 525/123; 525/124

(58) Field of Search ............................. 528/45; 525/124

(56) References Cited

U.S. PATENT DOCUMENTS 5,126,424 A * 6/1992 Brindopke et al.
5,849,855 A * 12/1998 Usui et al.
6,274,693 B1 * 8/2001 Poth et al.

* cited by examiner

*Primary Examiner*—Rachel Gorr
(74) *Attorney, Agent, or Firm*—Rader, Fishman & Grauer PLLC

(57) ABSTRACT

A blocked isocyanate group-containing resin composition and a thermosetting resin composition using the same that comprise a resin (C) obtainable by modifying a resin (A) having two or more blocked isocyanate groups of a specific molecular structure in one molecule with a specific monohydric alcohol (B), and by replacing the substituent of the blocked isocyanate groups with a group having a larger number of carbon atoms, thereby lowering solubility parameter value. The compositions exhbit good storage stability and good compatibility with base resins for paint.

11 Claims, No Drawings

BLOCKED ISOCYANATE GROUP-CONTAINING RESIN COMPOSITION AND THERMOSETTING COMPOSITION CONTAINING THE SAME

TECHNICAL FIELD OF THE INVENTION

The present invention relates to a blocked isocyanate group-containing resin composition, and more particularly, it relates to a blocked isocyanate group-containing resin composition excellent in curability at low temperature and compatibility with base resins for paint and useful as a curing agent component, and a thermosetting composition containing the same.

BACKGROUND OF THE INVENTION

Recently, in view of the environmental preservation, it has been required to reduce the energy consumption at a paint baking step. On the other hand, the application of a baking paint to materials having a low thermal resistance has been desired owing to diversified substrates to be applied. For these demands, a paint wherein a resin having isocyanate groups blocked with an active methylene compound such as an acetoacetate ester or a malonate diester is used as a curing agent is promising because it is cured at a relatively low temperature. Various resins having isocyanate groups blocked with an active methylene compound are disclosed in, for example, Japanese Laid-Open Patent Publication Nos. 60-149572/1985, 57-121065/1982, 8-319332/1996, 10-231347/1998, 10-231348/1998.

However, the above resins having isocyanate groups blocked with an active methylene compound have defects that they sometimes crystallize at a low temperature or they tend to become inhomogeneous or clouded through phase separation into an islands-sea structure depending on the base resin component used owing to their low compatibility with common resins for paint. Therefore, they involve a problem that the kind of resins usable is limited and thus freedom at paint design is restricted. As a measure against the problem, Japanese Laid-Open Patent Publication No. 6-16769/1994 discloses a method of reacting, with a monohydric alcohol, isocyanate groups other than the isocyanate groups blocked with an active methylene compound. The method described in the publication improves the above defects to some extent but the compatibility with resins for paint is still insufficient.

On the other hand, in view of advanced environmental preservation, the use of water-based paints has been required. However, when the resins having isocyanate groups blocked with an active methylene compound are used as curing agents for water-based paints, the resulting water-based paints have poor viscosity-stability at storage and thus are accompanied by a problem that the paint viscosity decreases largely with the passage of time and the workability at painting remarkably lowers.

SUMMARY OF THE INVENTION

As a result of an extensive studies for solving the above problem, the present inventors have found that a resin obtainable by modifying a resin having blocked isocyanate groups of a specific structure with a specific alcohol and having a solubility parameter value lower than that of the resin before the modification is excellent in compatibility with various base resin components for paint and is useful as a curing agent, and therefore, they have accomplished the present invention.

The present invention relates a blocked isocyanate group-containing resin composition, comprising a resin (C) obtainable by modifying a resin (A) having, in one molecule, two or more blocked isocyanate groups represented by the following formula (I) or (II):

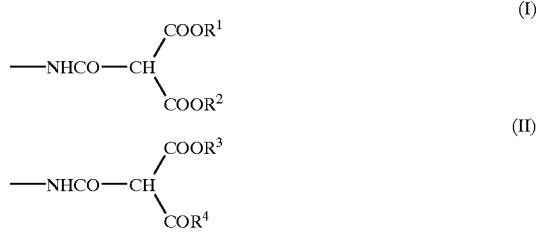

wherein $R^1$, $R^2$, $R^3$, and $R^4$, which are the same or different, each represents a substituent having 1 to 10 carbon atoms, with a monohydric alcohol (B) represented by the following formula (III):

wherein $R^5$ represents a substituent having 3 to 8 carbon atoms, whereby at least one of $R^1$, $R^2$, and $R^3$ in the blocked isocyanate group in the resin (A) is replaced by $R^5$. The resin (C) exhibits a lowered solubility parameter as compared with the resin (A).

The resin (A) may be obtained by reacting the isocyanate groups in a polyisocyanate compound (a) having at least two isocyanate groups in one molecule with an active methylene compound (b). Part of the isocyanate groups in the polyisocyanate compound (a) may be reacted with a monohydric alcohol. The resin (A) may be a resin obtainable by homopolymerizing a vinyl monomer containing a blocked isocyanate group represented by the formula (I) or (II), or copolymerizing the monomer with other vinyl monomer.

The $R^5$ in the monohydric alcohol (B) may be a substituent having 5 to 18 carbon atoms containing no hetero atom. The monohydric alcohol (B) may be one or more selected from mono(or oligo)propylene glycol monoalkyl ethers having 4 to 10 carbon atoms, mono(or oligo)ethylene glycol monoalkyl ethers having 4 to 10 carbon atoms, and aliphatic alcohols having 4 to 10 carbon atoms. The $R^5$ in the monohydric alcohol (B) may be a group having more number of carbon atoms than the number of carbon atoms of least one of $R^1$, $R^2$, and $R^3$ in the resin (A).

The resin (C) may be obtainable by removing part or all of the alcohol derived from at least one selected from $R^1$, $R^2$, and $R^3$ in the blocked isocyanate groups in the resin (A). In this case, part or all of the alcohol derived from at least one selected from $R^1$, $R^2$, and $R^3$ in the blocked isocyanate groups in the resin (A) may be removed by heating and vacuuming operation.

PREFERRED EMBODIMENTS OF THE INVENTION

In the present invention, the resin (A) has two or more blocked isocyanate groups represented by the above formula (I) or (II) in one molecule, and is usually obtained by reacting the isocyanate groups in a polyisocyanate compound (a) having at least two isocyanate groups in one molecule with an active methylene compound (b). In the above formula (I) or (II), $R^1$, $R^2$, $R^3$, and $R^4$, which are the same or different, each represents a substituent having 1 to 10 carbon atoms, and the substituent may contains a hetero atom and is preferably a substituent having 1 to 8 carbon atoms.

Examples of the above polyisocyanate compound (a) include diisocyanates having 4 to 25 carbon atoms such as diphenylmethane-4,4'-diisocyanate (MDI), 1,5-naphthalene diisocyanate, tolylene diisocyanate (TDI), xylylene diisocyanate, 1,4-tetramethylene diisocyanate, 2-methyl-1,5-diisocyanatopentane (MPDI), 1,6-diisocyanatohexane (HDI), 2,2,4-trimethyl-1,6-hexamethylene diisocyanate (TMDI), lysine diisocyanate, 1-isocyanato-3,5,5-trimethyl-3-(isocyanatomethyl)cyclohexane (IPDI), dicyclohexylmethane-4,4'-diisocyanate (HMDI), m-tetramethylxylylene diisocyanate (TMXDI), diisocyanatonorbornane, and di(isocyanatomethyl)norbornane, triisocyanates having 6 to 30 carbon atoms such as 2-(isosyanatoethyl)-2,6-diisocyanatocaproate (LTI), adducts of these di- or triisocyanates with a polyhydric hydroxyl group-containing compound, a monohydric alcohol, or water; polyisocyanates containing a urethane structure, a biuret structure, an isocyanurate structure, an allophanate structure, or a urethodione structure, and having a number-average molecular weight of 300 to 20000 and an average number of isocyanate groups in one molecule of 2 to 100; polyisocyanates obtainable by homopolymerizing isocyanate group-containing vinyl monomers such as (meth)acryloyl isocyanate, 2-isocyanatoethyl (meth)acrylate, m-isopropenyl-α,α'-dimethylbenzyl isocyanate, and 1:1 adducts of hydroxyl group-containing vinyl monomers with the above diisocyanates, or copolymerizing the isocyanate group-containing vinyl monomers with other vinyl monomers such as (meth)acrylate esters and vinyl aromatic compounds, and having a number-average molecular weight of 1000 to 20000, and an average number of isocyanate groups in one molecule of 2 to 100; and the like. These may be used singly or as a combination of two or more of them. Moreover, a polyisocyanate derived from one of these various polyisocyanates, and one or more selected from polyhydric hydroxyl group-containing compound, water and monohydric alcohols having a molecular weight of 32 to 400, and having a number-average molecular weight of 300 to 20000 and an average number of isocyanate groups in one molecule of 2 to 100 can be also used as the polyisocyanate compound (a).

Among these polyisocyanates, particularly preferred are isocyanurate type polyisocyanates of diisocyanates or isocyanurate type polyisocyanates of adducts of diisocyanates with a polyhydric hydroxyl group-containing compound, a monohydric alcohol, or water. The modification with a polyhydric hydroxyl group-containing compound, a monohydric alcohol, or water is a urethanization reaction with an isocyanate group, and may be carried out before or after the isocyanuration of the polyisocyanates. In the isocyanuration, a catalyst may be used. The catalyst is suitably a basic compound such as a metal hydroxide, a metal alkoxide, a metal carboxylate, a metal acetylacetonate, hydroxide of an onium salt, an onium carboxylate, a metal salt of an active methylene compound, or an onium salt of an active methylene compound or a Lewis acid such as an organotin compound. The onium salt is preferably an ammonium salt, a phosphonium salt, or a sulfonium salt. Usually, the amount of the catalyst is suitably in the rage of 10 to 10000 ppm, particularly 20 to 5000 ppm. The reaction may be carried out at 0° C. to 150° C. When the reaction has proceeded as aimed, the reaction may be terminated by neutralizing the basic compound of the catalyst. Unreacted isocyanates may be optionally removed after the completion of the isocyanuration.

The above polyhydric hydroxyl group-containing compound is a polyol having a number-average molecular weight of 60 to 10000 and two or more hydroxyl groups in one molecule, and examples thereof include compounds having two or more hydroxyl groups in one molecule, such as ethylene glycol, propylene glycol, polyethylene glycol, polypropylene glycol, butanediol, polytetramethylene glycol, methylpropanediol, pentanediol, methylpentanediol, hexanediol, neopentyl glycol, 2-butyl-2-ethyl-1,3-propanediol, 2,2-diethyl-1,3-propanediol, 1,4-cyclohexanedimethanol, tricyclodecanedimethanol, 2-ethyl-1,3-hexanediol, 2,2,4-trimethyl-1,3-pentanediol, hydroxypivalic acid-neopentyl glycol ester, dimethylolpropanoic acid, dimethylolbutanoic acid, trimethylolethane, trimethylolpropane, trimethylolbutane, glycerol, and pentaerythritol; at least one ring-opening adduct of one of these compounds and one compound selected from ethylene oxide, propylene oxide, tetrahydrofuran, a lactone and a cyclic carbonate; reaction products of compounds having both of an amino group and hydroxyl group in one molecule with an epoxy group-containing compound, reaction products of compounds having both of an amino group and hydroxyl group in one molecule with a polyisocyanate, polyesters containing hydroxyl groups, polyurethanes having hydroxyl groups, vinyl copolymers containing hydroxyl groups, epoxy resins, and the like.

The resin (A) is usually a compound obtainable by reacting the isocyanate groups in the above polyisocyanate compound (a) with an active methylene compound (b), but the resin can be also obtained by homopolymerizing a blocked isocyanate group-containing vinyl monomer represented by the above formula (I) or (II) or copolymerizing the monomer with other vinyl monomer beforehand. The blocked isocyanate group-containing vinyl monomer is obtainable by blocking the above isocyanate group-containing vinyl monomer with an active methylene compound or by blocking the isocyanate group present at the one end of one of the above diisocyanates with an active methylene compound and then reacting the remaining isocyanate groups with a hydroxyl group-containing vinyl monomer. Particular, in view of the yield, preferred are compounds obtainable by the latter method.

Examples of the active methylene compound (b) blocking the isocyanate groups in the above polyisocyanate compound (a) include malonate esters such as dimethyl malonate, diethyl malonate, diisopropyl malonate, di-n-butyl malonate, diisobutyl malonate, di-sec-butyl malonate, di-t-butyl malonate, di(2-ethylhexyl) malonate, methyl isopropyl malonate, ethyl isopropyl malonate, methyl n-butyl malonate, ethyl n-butyl malonate, methyl isobutyl malonate, ethyl isobutyl malonate, methyl sec-butyl malonate, and ethyl sec-butyl malonate; acetoacetates such as methyl acetoacetate, ethyl acetoacetate, isopropyl acetoacetate, n-butyl acetoacetate, isobutyl acetoacetate, sec-butyl acetoacetate, and t-butyl acetoacetate; β-diketones such as acetylacetone. These may be used singly or as a combination of two or more of them. Among them, particularly preferred is diethyl malonate or ethyl acetoacetate.

At the blocking reaction of the isocyanate group with the above active methylene compound (b), a reaction catalyst may be used, if necessary. The reaction catalyst is suitably a basic compound such as a metal hydroxide, a metal alkoxide, a metal carboxylate, a metal acetylacetonate, a hydroxide of onium salt, an onium carboxylate, a metal salt of active methylene compound, an onium salt of active methylene compound, an aminosilane, an amine, a phosphine, or the like. Among them, the onium salt is preferably an ammonium salt, a phosphonium salt, or a sulfonium salt. Usually, the amount of the catalyst is suitably in the range of 10 to 10000 ppm, particularly 20 to 5000 ppm relative to the total amount of the isocyanate compound and the active methylene compound. The above reaction may be carried out at 0° C. to 150° C., and a solvent may be used. In this case, the solvent is preferably a non-protic solvent, and particularly preferred is an ester, an ether, an N-alkylamide, a ketone, or the like. When the reaction has proceeded as aimed, the reaction may be terminated by adding an acid to neutralize the basic compound of the catalyst.

The amount of the active methylene compound (b) to be used is not particularly limited but is preferably from 0.1 to 3 equivalents, more preferably 0.2 to 2 equivalents relative to 1 equivalent of the isocyanate group in the polyisocyanate compound (a). Unreacted active methylene compound can be removed after the blocking reaction.

Moreover, other than the above active methylene compound (b), a blocking agent such as an alcohol, a phenol, an oxime, an amine, an acid amide, an imidazole, a pyridine, or a mercaptan may be used in combination within the range at which curability at low temperature is not inhibited.

Moreover, part of the isocyanate groups in the above polyisocyanate compound (a) may be reacted with at least one selected from the above polyhydric hydroxyl group-containing compound, water and the monohydric alcohol, and in particular, preferably reacted with monohydric alcohol in view of the compatibility with a base resin component. The order of the reaction with the active methylene compound (b) may be the order that necessary amount of the isocyanate groups are blocked with the active methylene compound (b) and then the remaining isocyanate groups are reacted with a monohydric alcohol, or the reverse order, or the active methylene compound (b) and a monohydric alcohol may be reacted with the isocyanate groups all at once. Examples of the monohydric alcohol include propanol, butanol, hexanol, heptanol, 2-ethylhexanol, octanol, nonanol, decanol, tridecanol, stearyl alcohol, and isomers thereof, mono (oligo or poly)ethylene glycol monoalkyl ethers, mono(oligo or poly)propylene glycol monoalkyl ethers, and the like. Since too much use of the monohydric alcohol sometimes causes decrease of curability, the amount of the monohydric alcohol to be used is suitably 0.6 equivalent or less, preferably 0.4 equivalent or less relative to 1 equivalent of the isocyanate group in the polyisocyanate compound (a).

The resin (A) having two or more blocked isocyanate groups represented by the following formula (I) or (II) in one molecule, obtained as above, has suitably a number-average molecular weight of 500 to 20000, preferably 800 to 18000. When the molecular weight is less than 500, the curability of the resulting coated film is lowered. On the other hand, when the molecular weight exceeds 20000, the appearance of the coated film is lowered. Thus, both cases are not preferred. Moreover, the resin (A) has desirably a solubility parameter value ranging from 8.2 to 11.5, preferably from 8.3 to 11.3. The solubility parameter value (hereinafter, sometimes abbreviated as "SP value") is a measure of solubility. When the value is too large or too small, the compatibility with common base resins for paint frequently decreases. In the present invention, the value is a numerical value obtainable by actual measurement in accordance with turbidimetric titration method as shown in the following.

In the turbidimetric titration method, a resin is dissolved in a good solvent, and a poor solvent is added dropwise to measure the amount of the poor solvent required for occurrence of clouding. This measurement is carried out separately using two kinds of poor solvent, i.e., a poor solvent having a small SP value (n-hexane or the like) and a poor solvent having a large SP value (deionized water or the like). Specifically, 0.5 g of a resin to be measured is weighed in a 100 ml beaker, and is dissolved in 10 ml of acetone. Two of this solution are prepared. Next, a poor solvent, n-hexane is added dropwise to one of them by means of a buret and the amount of n-hexane required for occurrence of clouding was measured (the amount is referred to as H (ml)). For another solution, a similar experiment is carried out using deionized water as a poor solvent and the amount of deionized water required for occurrence of clouding is measured (the amount is referred to as W (ml)). The titration is carried out in a constant-temperature room at 20° C. The SP value is determined by substituting H and W into the following equation.

$$\text{SP value} = ((9.75 \times (1-\alpha) + 7.24 \times \alpha) \times (\sqrt{\alpha}) + (9.75 \times (1-\beta) + 23.43 \times \beta) \times (\sqrt{\beta}))/((\sqrt{\alpha}) + (\sqrt{\beta}))$$

provided that $\alpha = H/(H+10)$, and $\beta = W/(W+10)$.

By the way, the values 9.75, 7.24, and 23.43 derive from the SP values of acetone, n-hexane, and deionized water, respectively.

In the present invention, the above resin (A) is modified with a monohydric alcohol (B) represented by the above formula (III) to obtain the resin (C) wherein at least one of $R^1$, $R^2$, and $R^3$ in the blocked isocyanate groups in the resin (A) is replaced by $R^5$. The resin (C) has a lowered SP value as compared with the above resin (A). The above monohydric alcohol (B) is a compound represented by the above formula (III) wherein $R^5$ represents a substituent having 3 to 18 carbon atoms, and the substituent may or may not contain a hetero atom. In the case that a hetero atom is contained, a substituent having 5 to 18 carbon atoms is suitable and in particular, a substituent having 6 to 18 carbon atoms is preferred. In the case of a substituent having 1 or 2 carbon atoms, the SP value of the resin (C) is not lowered. On the other hand, in the case of a substituent having more than 18 carbon atoms, the dissolving power of the resin (A) sometimes decreases. Thus, both cases are not preferred.

Examples of the monohydric alcohol (B) include aliphatic alcohols such as propanol, butanol, pentanol, hexanol, 2-ethylhexanol, heptanol, octanol, nonanol, decanol, undecanol, dodecanol, tridecanol, tetradecanol, pentadecanol, hexadecanol, heptadecanol, octadecanol, and isomeric alcohols thereof; mono(or oligo)ethylene glycol monoalkyl ethers such as ethylene glycol monoalkyl ethers, diethylene glycol monoalkyl ethers, triethylene glycol monoalkyl ethers, and tetraethylene glycol monoalkyl ethers; mono(or oligo)propylene glycol monoalkyl ethers such as propylene glycol monoalkyl ethers, dipropylene glycol monoalkyl ethers, tripropylene glycol monoalkyl ethers, and tetrapropylene glycol monoalkyl ethers; mono(or oligo)ethylene glycol monoesters such as ethylene glycol monoesters, diethylene glycol monoesters, triethylene glycol monoesters, and tetraethylene glycol monoesters; mono (or oligo)propylene glycol monoesters such as propylene glycol monoesters, dipropylene glycol monoesters, tripropylene glycol monoesters, and tetrapropylene glycol monoesters; and the like. These compounds may be used singly or as a combination of two or more of them. The monohydric alcohol (B) is suitably selected depending on $R^1$, $R^2$, and $R^3$ in the resin (A).

Among the exemplified compounds, in view of the storage stability in water-based paints, preferred is a monohydric alcohol wherein $R^5$ is a substituent containing no hetero atom and having 5 to 18, preferably 6 to 15 carbon atoms, and particularly preferred is an aliphatic alcohol having 6 to 15 carbon atoms also from the viewpoint of dissolving power. An alcohol having less than 4 carbon atoms is not preferred since the viscosity of the resulting water-based paint sometimes decreases largely at the storage.

On the other hand, among the exemplified compounds, in the case of the use for organic solvent-based paints, preferred are particularly mono(or oligo)propylene glycol monoalkyl ethers having 4 to 10 carbon atoms such as propylene glycol monomethyl ether and propylene glycol monopropyl ether; mono(or oligo)ethylene glycol monoalkyl ethers having 4 to 10 carbon atoms such as ethylene glycol monobutyl ether, and aliphatic alcohols having 4 to 10 carbon atoms in view of dissolving power.

The number of carbon atoms of $R^5$ in the above formula (III) may be optionally selected depending on the number of carbon atoms of $R^1$, $R^2$, and $R^3$ in the blocked isocyanate groups in the resin (A). For particularly efficiently lowering the SP value, the number of carbon atoms of $R^5$ is preferably more than the number of carbon atoms of any of $R^1$, $R^2$, and $R^3$. When the number of carbon atoms of $R^5$ is less than the number of carbon atoms of any of $R^1$, $R^2$, and $R^3$, the SP value is not lowered in many cases even after the modification, and thus, the case is not preferred.

In the present invention, the procedure for modifying the resin (A) with the monohydric alcohol (B) is not particularly limited as far as the procedure is capable of replacing at least one of $R^1$, $R^2$, and $R^3$ in the blocked isocyanate group in the resin (A) by $R^5$, but it is desirable to use the procedure of obtaining the resin (C) by removing part or all of the alcohol derived from at least one of $R^1$, $R^2$, and $R^3$ in the resin (A) from the system into outside through distillation or the like by heating or vacuuming. With regard to the conditions, it is suitable to remove part or all of the above alcohol at a temperature of 20 to 180° C., preferably 40 to 130° C. over a period of 5 minutes to over ten hours, preferably 10 minutes to 10 hours and, if necessary, under reduced pressure. Too low temperature is not preferable since the SP value of the resulting resin (C) is hardly lowered possibly owing to slow exchange of the alkoxy group. Also, too high temperature causes coloration and thus, is not preferable. Moreover, in order to control the molecular weight of the resin (C), the above removing operation may be carried out after the addition of the above polyhydric hydroxyl group-containing compound to the resin (A) in addition to the monohydric alcohol (B).

The amount of the monohydric alcohol (B) to be used for the modification is from 5 to 500 parts by weight, preferably 10 to 200 parts by weight relative to 100 parts by weight of solid content of the resin (A). When the amount is less than 5 parts by weight, the effect of the modification becomes small and thus the SP value of the resulting resin (C) is hardly lowered. On the other hand, the use of the alcohol in an amount exceeding 500 parts by weight is economically disadvantageous in view of the cost. Thus, both cases are not preferred.

The resin (C) obtainable as above is a resin having two or more blocked isocyanate groups in one molecule and has an SP value lower than that of the resin (A). The SP value is desirably in the range of 8.0 to 11.0, preferably 8.1 to 10.8. Moreover, the number-average molecular weight of the resin (C) is desirably in the range of 600 to 30000, preferably 900 to 25000. When the molecular weight is less than 600, the curability of the resulting coated film is lowered, and when the molecular weight exceeds 30000, the appearance of the coated film is lowered. Thus, both cases are not preferred. The resin (C) thus obtained has a largely improved compatibility with the common resins for paint and also, a largely improved storage stability in the case of the use for water-based paints.

The present invention also provides a thermosetting composition comprising the resin (C) obtained as above and a polyol (D). The thermosetting composition is a composition usually comprising the resin (C) as a curing agent component and the polyol (D) as a base resin component.

As the above polyol (D), those hitherto known as base resins for paint are applicable without particular limitation. Usually, vinyl resins, polyester resins, polyurethane resins, polyurethane polyester resins, fluorine resins, silicon resins, and the like having a number-average molecular weight of 1000 to 80000, preferably 1200 to 60000 and a hydroxyl value of 5 to 220 mg KOH/g (solid content), preferably 10 to 200 mg KOH/g can be used. These compounds may be used singly or as a combination of two or more of them. When the number-average molecular weight of the polyol (D) is smaller than 1000, the curability of the resulting coated film is lowered, and when the molecular weight exceeds 80000, the appearance of the coated film is lowered. Thus, both cases are not preferred. Moreover, the hydroxyl value is smaller than 5 mg KOH/g, the curability of the resulting coated film is lowered, and when the value exceeds 200 mg KOH/g, the water resistance of the coated film is decreased. Thus, both cases are not preferred.

The above polyol (D) can be used as an organic solvent soluble form or a dispersed form, and may contain, if necessary, a croslinking functional group such as carboxyl group, carbonyl group, silanol group, or epoxy group, and a water-soluble functional group such as sulfonic acid group, phosphoric acid group, a metal carboxylate group, a metal sulfonate group, a metal phosphate group, an onium carboxylate group, an onium sulfonate group, an onium phosphonate group, poly(ethylene oxide) group, poly(propylene oxide) group, or poly(ethylene oxide/propylene oxide) group. As such an onium, preferred is ammonium, phosphonium, or sulfonium. In the case that the polyol (D) has the water soluble functional group, it may be used as such or neutralized with a neutralizing agent or the like. The content of the water-soluble functional group is not particularly limited but in view of water resistance, the content is preferably 2.0 mmol/g (solid content) or less in the polyol.

Among the above examples of the polyol (D), as the vinyl resins, the compounds known per se can be used and examples thereof include acrylic resins and vinyl resins obtainable by copolymerizing a hydroxyl group-containing monomer with other polymerizable monomer. These resins can be obtained by solution polymerization, emulsion polymerization, or suspension polymerization. Examples of the hydroxyl group-containing monomer include hydroxyalkyl esters of (meth)acrylic acid such as 2-hydroxyethyl (meth)acrylate, hydroxypropyl (meth)acrylate, 4-hydroxybutyl (meth)acrylate, and ring-opening adducts of these compound to one compound selected from ethylene oxide, propylene oxide, tetrahydrofuran, lactones, and cyclic carbonates. Examples of other polymerizable monomer include alkyl esters of (meth)acrylic acid such as methyl (meth)acrylate, ethyl (meth)acrylate, n-butyl (meth)acrylate, isobutyl (meth)acrylate, 2-ethylhexyl (meth)acrylate, lauryl (meth)acrylate, cyclohexyl (meth)acrylate, and isobornyl (meth)acrylate; unsaturated carboxylic acids such as (meth) acrylic acid, maleic acid, and itaconic acid; acrylamide derivatives such as (meth)acrylamide, N-methylolacrylamide, and diacetone acrylamide; glycidyl (meth)acrylate, vinyl acetate, vinyl propionate, styrene, α-methylstyrene, vinyltoluene, and the like. These compounds may be used singly or as a combination of two or more of them.

Among the above examples of the polyol (D), as the polyester resins, the compounds known per se can be used and examples thereof include polyester resins obtainable by esterification of polyhydric alcohols with polybasic acids. Examples of usable polyhydric alcohol include ethylene glycol, diethylene glycol, propylene glycol, butanediol, pentanediol, hexanediol, 2,2-dimethylpropanediol (neopentyl glycol), 2-butyl-2-ethyl-1,3-propanediol, glycerol, trimethylolpropane, trimethylolethane, pentaerythritol, and the like. Examples of usable polybasic acid include phthalic anhydride, isophthalic acid, tetrahydrophthalic anhydride, hexahydrophthalic anhydride, maleic anhydride, succinic anhydride, adipic acid, sebacic acid, trimellitic anhydride, pyromellitic anhydride, and the like. Furthermore, if necessary, monobasic acids such as benzoic acid and t-butylbenzoic acid, and caster oil, tung oil, safflower oil, soybean oil, linseed oil, tall oil, coconut oil, oil components derived from these fatty acids, as well as epoxy compounds such as glycidyl ester of neodecanoic acid can be used.

In the thermosetting composition of the invention, the using ratio of the resin (C) and the polyol (D) is preferably in the range of 1:0.5 to 1:20 based on the solid content of the both components. The ratio lower or higher than the range is not desirable since the curability is lowered in many cases.

Into the thermosetting composition of the invention, other than the above resin (C), a curing agent capable of reacting with the crosslinking functional group in the polyol (D), for example, a melamine resin, a urea resin, an epoxy group-containing compound or resin, a carboxyl group-containing compound or resin, an acid anhydride, an alkoxysilane group-containing compound or resin, a hydrazide compound may be incorporated, if necessary.

The thermosetting composition of the invention may be any form such as solvent-type or water-based. In any case, the composition can be cured by maintaining it at 60 to 160° C. for several minutes to several hours. At that time, the curing may be accelerated by adding a curing catalyst. Examples of the curing catalyst include basic compounds such as metal hydroxides, metal alkoxides, metal carboxylates, metal acetylacetonates, hydroxides of onium salts, onium carboxylates, halides of onium salts, metal salts of active methylene compounds, onium salts of active methylene compounds, aminosilanes, amines, and phosphines, and Lewis acidic compounds such as organotin compounds, organozinc compounds, organotitanium compounds, and organozirconium compounds. As the onium salts, preferred are ammonium salts, phosphonium salts, and sulfonium salts.

Into the thermosetting composition of the invention, pigments such as an extender, a coloring pigment, and metallic pigments; additives for paint such as a UV absorber, a light stabilizer, a radical stabilizer, a yellowing-preventive agent which inhibits coloration at baking step, a coated surface regulator, a flowing regulator, a pigment dispersant, a defoaming agent, a thickening agent, and a film-forming auxiliary agent may be optionally incorporated, if necessary.

The thermosetting composition of the invention may be used as a clear or an enamel.

EXAMPLES

The following will explain the present invention in further detail with reference to Examples. The invention is not limited to Examples. By the way, "part(s)" and "%" mean "part(s) by weight" and "% by weight", respectively. Production of blocked isocyanate-group containing resin (A)

Production Example 1

In a 2-liter flask fitted with a thermometer, a thermostat, a stirrer, a reflux condenser, a dropping pump, and the like, 605 g of "Smidur N-3300" (a polyisocyanate containing an isocyanurate structure manufactured by Sumitomo Bayer Urethane Co., Ltd., number-average molecular weight of about 600, isocyanate content of 21.6%), 413 g of diethyl malonate, and 181 g of ethyl acetate were mixed, and 7.0 g of 28% methanol solution of sodium methoxide was added to the mixture under a nitrogen stream, followed by maintaining the whole at 60° C. for 12 hours. Thereafter, the NCO value was measured to determine the isocyanate content to be 0.2W. Thereto was added 99 g of ethyl acetate to obtain a resin (A-1) solution. The SP value of the resin (A-1) was found to be 10.8 and the number-average molecular weight was found to be about 3000.

Production Example 2

Into a 5-liter flask similar to the flask in Production Example 1 were added 4000 g of hexamethylene diisocyanate and 32 g of 2-butyl-2-ethyl-1,3-propanediol, followed by maintaining the whole at 100° C. for 1 hour under a nitrogen stream. Then, tetramethylammonium laurate was added thereto at 60° C. as an isocyanation catalyst, and the isocyanuration reaction was terminated by adding dibutyl phosphate when the yield reached 23.0%. Thereafter, unreacted hexamethylene diisocyanate was removed by means of a thin-film distillation apparatus to obtain a polyisocyanate having an isocyanate content of 22.8% and a number-average molecular weight of about 600. In a 2-liter flask, 605 g of the polyisocyanate, 413 g of diethyl malonate, and 181 g of ethyl acetate were mixed, and 8.0 g of 28% methanol solution of sodium methoxide was added to the mixture, followed by maintaining the whole at 60° C. for 12 hours. Thereafter, the NCO value was measured to determine the isocyanate content to be 0.1%. Thereto was added 99 g of ethyl acetate to obtain a resin (A-2) solution. The SP value of the resin (A-2) was found to be 10.8 and the number-average molecular weight was found to be about 3000.

Production Example 3

Into a 2-liter flask similar to the flask in Production Example 1 were placed 605 g of "Duranate TPA-100" (a polyisocyanate containing an isocyanurate structure manufactured by Asahi Chemical Co., Ltd., number-average molecular weight of about 600, isocyanate content of 23.1%) and 120 g of ethyl acetate, followed by heating the whole to 100° C. Then, 52 g of 2-ethylhexanol was added thereto under a nitrogen stream, followed by maintaining the whole at 100° C. for 2 hours. Thereafter, 345 g of diethyl malonate and 60 g of ethyl acetate were added thereto and the whole was maintained at 60° C. Then, 7.0 g of 28% methanol solution of sodium methoxide was added to the mixture under a nitrogen stream, followed by maintaining the whole at 60° C. for 10 hours. Thereafter, the NCO value was measured to determine the isocyanate content to be 0.2%. Thereto was added 109 g of ethyl acetate to obtain a resin (A-3) solution. The SP value of the resin (A-3) was found to be 10.3 and the number-average molecular weight was found to be about 3000.

Production Example 4

Into a 2-liter flask similar to the flask in Production Example 1 were placed 605 g of "Smidur N-3300" and 120 g of ethyl acetate, followed by heating the whole to 100° C. Then, 104 g of 2-ethylhexanol was added thereto under a nitrogen stream, followed by maintaining the whole at 100° C. for 2 hours. Thereafter, 270 g of diethyl malonate and 60 g of ethyl acetate were added thereto and the whole was maintained at 60° C. Then, 9.0 g of 28% methanol solution of sodium methoxide was added to the mixture, followed by maintaining the whole at 60° C. for 12 hours. Thereafter, the NCO value was measured to determine the isocyanate content to be 0.2%. Thereto was added 110 g of ethyl acetate to obtain a resin (A-4) solution. The SP value of the resin (A-4) was found to be 10.0 and the number-average molecular weight was found to be about 3000.

Production Example 5

In a 2-liter flask similar to the flask in Production Example 1, 605 g of "Smidur N-3300", 17 g of ethyl acetoacetate, 392 g of diethyl malonate, and 181 g of ethyl acetate were mixed, and 7.0 g of 28% methanol solution of sodium methoxide was added to the mixture under a nitrogen stream, followed by maintaining the whole at 60° C. for 12 hours. Thereafter, the NCO value was measured to determine the isocyanate content to be 0.2%. Thereto was added 99 g of ethyl acetate to obtain a resin (A-5) solution. The SP value of the resin (A-5) was found to be 10.7 and the number-average molecular weight was found to be about 3000.

Production Example 6

Into a 2-liter flask similar to the flask in Production Example 1 were placed 605 g of "Duranate TPA-100" and 120 g of ethyl acetate, followed by heating the whole to 100° C. Then, 80 g of "Oxocol C13" (a structural isomer of tridecanol manufactured by Kyowa Yuka Co., Ltd.) was added thereto under a nitrogen stream, followed by maintaining the whole at 100° C. for 2 hours. Thereafter, 345 g of diethyl malonate and 60 g of ethyl acetate were added thereto and the whole was maintained at 60° C. Then, 7.0 g of 28% methanol solution of sodium methoxide was added to the mixture under a nitrogen stream, followed by maintaining the whole at 60° C. for 12 hours to obtain a resin (A-6) solution. The NCO value was measured to determine the isocyanate content to be 0.1%. The SP value of the resin (A-6) was found to be 10.2 and the number-average molecular weight was found to be about 3000.

Production Example 7

In a 2-liter flask similar to the flask in Production Example 1, 605 g of "Smidur N-3300", 413 g of diethyl malonate, and 181 g of ethyl acetate were mixed, and 7.0 g of 28% methanol solution of sodium methoxide was added to the mixture under a nitrogen stream, followed by maintaining the whole at 60° C. for 12 hours to obtain a resin (A-7) solution. The NCO value was measured to determine the isocyanate content to be 0.2%. The SP value of the resin (A-7) was found to be 10.8 and the number-average molecular weight was found to be about 3000. Production of blocked isocyanate-containing resin (C)

Example 1

Into a 2-liter flask fitted with a thermometer, a thermostat, a stirrer, a reflux condenser, a dropping pump, a simple trap for removed solvent, and the like were placed 505 g of the resin (A-1) solution obtained in Production Example 1 and 450 g of propylene glycol monopropyl ether, followed by heating to 90° C. Under reduced pressure, the solvent was removed by distillation over a period of 2 hours, while the temperature of the system being maintained at 80 to 90° C., to obtain 642 g of a resin (C-1) solution. In the simple trap for removed solvent, 42 g of ethanol was contained. The SP value of the resin (C-1) was found to be 10.1 and the number-average molecular weight was found to be about 3500.

Example 2

Into a 2-liter flask similar to the flask in Example 1 were placed 505 g of the resin (A-2) solution obtained in Production Example 2 and 450 g of propylene glycol monopropyl ether, followed by heating to 90° C. Under reduced pressure, the solvent was removed by distillation over a period of 2 hours, while the temperature of the system being maintained at 80 to 90° C., to obtain 630 g of a resin (C-2) solution. In the simple trap for removed solvent, 43 g of ethanol was contained. The SP value of the resin (C-2) was found to be 10.1 and the number-average molecular weight was found to be about 3500.

Example 3

Into a 2-liter flask similar to the flask in Example 1 were placed 800 g of the resin (A-3) solution obtained in Production Example 3 and 550 g of propylene glycol monopropyl ether, followed by heating to 90° C. Under reduced pressure, the solvent was removed by distillation over a period of 3 hours, while the temperature of the system being maintained at 80 to 90° C., to obtain 987 g of a resin (C-3) solution. In the simple trap for removed solvent, 40 g of ethanol was contained. The SP value of the resin (C-3) was found to be 9.9 and the number-average molecular weight was found to be about 3500.

Example 4

Into a 2-liter flask similar to the flask in Example 1 were placed 800 g of the resin (A-4) solution obtained in Production Example 4 and 550 g of propylene glycol monopropyl ether, followed by heating to 90° C. Under reduced pressure, the solvent was removed by distillation over a period of 4 hours, while the temperature of the system being maintained at 80 to 90° C., to obtain 885 g of a resin (C-4) solution. In the simple trap for removed solvent, 35 g of ethanol was contained. The SP value of the resin (C-4) was found to be 9.6 and the number-average molecular weight was found to be about 3500.

Example 5

Into a 2-liter flask similar to the flask in Example 1 were placed 505 g of the resin (A-5) solution obtained in Production Example 5 and 430 g of propylene glycol monopropyl ether, followed by heating to 90° C. Under reduced pressure, the solvent was removed by distillation over a period of 2 hours, while the temperature of the system being maintained at 80 to 90° C., to obtain 623 g of a resin (C-5) solution. In the simple trap for removed solvent, 35 g of ethanol was contained. The SP value of the resin (C-5) was found to be 10.0 and the number-average molecular weight was found to be about 3500.

Example 6

Into a 2-liter flask similar to the flask in Example 1 were placed 605 g of the resin (A-6) solution obtained in Production Example 6 and 488 g of 2-ethylhexanol, followed by heating to 90° C. Under reduced pressure, the solvent was removed by distillation over a period of about 1.5 hours, while the temperature of the system being maintained at 90 to 110° C., to obtain 872 g of a resin (C-6) solution. In the simple trap for removed solvent, 43 g of ethanol was contained. The SP value of the resin (C-6) was found to be 8.7 and the number-average molecular weight was found to be about 3500.

Example 7

Into a 2-liter flask similar to the flask in Example 1 were placed 605 g of the resin (A-6) solution obtained in Production Example 6 and 330 g of 4-methyl-2-pentanol, followed by heating to 90° C. Under reduced pressure, the solvent was removed by distillation over a period of about 1.5 hours, while the temperature of the system being maintained at 80 to 90° C., to obtain 765 g of a resin (C-7) solution. In the simple trap for removed solvent, 40 g of ethanol was contained. The SP value of the resin (C-7) was found to be 9.3 and the number-average molecular weight was found to be about 3500.

Example 8

Into a 2-liter flask similar to the flask in Example 1 were placed 600 g of the resin (A-7) solution obtained in Production Example 7 and 400 g of 4-methyl-2-pentanol, followed by heating to 90° C. Under reduced pressure, the solvent was removed by distillation over a period of about 1.5 hours, while the temperature of the system being maintained at 80 to 90° C., to obtain 780 g of a resin (C-8) solution. In the simple trap for removed solvent, 41 g of ethanol was contained. The SP value of the resin (C-8) was found to be 9.5 and the number-average molecular weight was found to be about 3500.

Example 9

Into a 2-liter flask similar to the flask in Example 1 were placed 605 g of the resin (A-6) solution obtained in Production Example 6 and 386 g of n-butanol, followed by heating to 90° C. Under reduced pressure, the solvent was removed by distillation over a period of about 1.5 hours, while the temperature of the system being maintained at 80 to 90° C., to obtain 720 g of a resin (C-9) solution. In the simple trap for removed solvent, 40 g of ethanol was contained. The SP value of the resin (C-9) was found to be 9.7 and the number-average molecular weight was found to be about 3500.

Example 10

Into a 2-liter flask similar to the flask in Example 1 were placed 605 g of the resin (A-6) solution obtained in Production Example 6 and 500 g of propylene glycol monopropyl ether, followed by heating to 90° C. Under reduced pressure, the solvent was removed by distillation over a period of about 1.5 hours, while the temperature of the system being maintained at 90° C., to obtain 840 g of a resin (C-10) solution. In the simple trap for removed solvent, 40 g of ethanol was contained. The SP value of the resin (C-10) was found to be 9.7 and the number-average molecular weight was found to be about 3500.

Comparative Example 1

Into a 2-liter flask similar to the flask in Example 1 were placed 505 g of the resin (A-1) solution obtained in Production Example 1 and 450 g of ethanol, followed by heating to 75° C. Under reduced pressure, the solvent was removed by distillation over a period of 2 hours, while the temperature of the system being maintained at 75 to 90° C., to obtain 550 g of a resin (C-11) solution. The SP value of the resin (C-11) was found to be 10.8 and the number-average molecular weight was found to be about 3000.

Comparative Example 2

Into a 2-liter flask similar to the flask in Example 1 were placed 505 g of the resin (A-1) solution obtained in Production Example 1, 300 g of ethanol, and 150 g of methanol, followed by heating to 75° C. Under reduced pressure, the solvent was removed by distillation over a period of 2 hours, while the temperature of the system being maintained at 75 to 85° C., to obtain 560 g of a resin (C-12) solution. The SP value of the resin (C-12) was found to be 10.9 and the number-average molecular weight was found to be about 3000.

Comparative Example 3

Into a 2-liter flask similar to the flask in Example 1 were placed 605 g of the resin (A-6) solution obtained in Production Example 6 and 550 g of ethanol, followed by heating to 75° C. Under reduced pressure, the solvent was removed by distillation over a period of about 1.5 hours, while the temperature of the system being maintained at 75 to 90° C., to obtain 650 g of a resin (C-13) solution. In the simple trap for removed solvent, 40 g of ethanol was contained. The SP value of the resin (C-13) was found to be 10.2 and the number-average molecular weight was found to be about 3000.

When the solutions of the resins (A) and (C) were stored at 10° C. for 1 month, the resin (A-1) solution, the resin (A-2) solution, and the resin (A-3) solution solidified and were inferior in workability at mixing as curing agents for paint possibly owing to their crystallinity. On the other hand, the resin (C-1) solution, the resin (C-2) solution, and the resin (C-3) solution were still liquid even after the storage at 10° C. for 1 month and had good workability at mixing possibly owing to the suppressed crystallinity.

Preparation of the Polyol (D)

Preparation Example 1

Into a 2-liter flask fitted with a thermometer, a thermostat, a stirrer, a reflux condenser, a dropping pump, a solvent trap, and the like were placed 361 g of neopentyl glycol, 156 g of trimethylolpropane, 445 g of adipic acid, and 180 g of isophthalic acid, followed by dehydrative condensation at 240° C. Thereafter, 52 g of trimellitic anhydride was added thereto and was subjected to the reaction, and then 690 g of ethylene glycol monobutyl ether was further added to obtain a polyol (D-1) solution. The hydroxyl value of the polyol (D-1) was found to be about 100 mg KOH/g, the acid value was found to be about 30 mg KOH/g, and the number-average molecular weight was found to be about 2000.

Preparation Example 2

Into a 2-liter flask similar to the flask in Preparation Example 1 were placed 210 g of neopentyl glycol, 152 g of trimethylolpropane, 158 g of 1,6-hexanediol, 289 g of adipic acid, and 333 g of isophthalic acid, followed by dehydrative condensation at 240° C. Thereafter, 22 g of trimellitic anhydride was added thereto and was subjected to the reaction, and then 680 g of propylene glycol monopropyl ether was further added to obtain a polyol (D-2) solution. The hydroxyl value of the polyol (D-2) was found to be about 110 mg KOH/g, the acid value was found to be about 20 mg KOH/g, and the number-average molecular weight was found to be about 2000.

Preparation Example 3

Into a 5-liter flask fitted with a thermometer, a thermostat, a stirrer, a reflux condenser, a dropping pump, and the like were placed 500 g of propylene glycol monopropyl ether and 400 g of propylene glycol monomethyl ether, followed by heating to 8° C. Thereto was added dropwise a mixed solution of 200 g of 2-hydroxyethyl acrylate, 90 g of 2-hydroxyethyl methacrylate, 175 g of acrylic acid, 660 g of methyl methacrylate, 300 g of isobutyl acrylate, 400 g of n-butyl acrylate, 300 g of 2-ethylhexyl methacrylate, 400 g of propylene glycol monopropyl ether, and 60 g of 2,2'-azobis (2,4-dimethylvaleronitrile) under a nitrogen stream, and then 450 g of propylene glycol monomethyl ether was further added to obtain a polyol (D-3) solution. The hydroxyl value of the polyol (D-3) was found to be about 60 mg KOH/g, the acid value was found to be about 60 mg KOH/g, and the number-average molecular weight was found to be about 15000.

Preparation Example 4

Into a 5-liter flask similar to the flask in Preparation Example 1 were placed 563 g of neopentyl glycol, 314 g of trimethylolpropane, 127 g of isophthalic acid, 737 g of hexahydrophthalic anhydride, and 750 g of "EMPOL 1061" 'a dimer acid manufactured by Cognis Japan), followed by dehydrative condensation at 240° C. Thereafter, 170 g of trimellitic anhydride was added thereto and was subjected to the reaction, and then 1660 g of ethylene glycol monobutyl ether was further added to obtain a polyol (D-4) solution. The hydroxyl value of the polyol (D-4) was found to be about 70 mg KOH/g, the acid value was found to be about 45 mg KOH/g, and the number-average molecular weight was found to be about 2500.

Preparation Example 5

Into a 2-liter flask similar to the flask in Preparation Example 1 were placed 218 g of neopentyl glycol, 222 g of 2-ethyl-2-butyl-1,3-propanediol, 158 g of trimethylolpropane, 135 g of adipic acid, and 498 g of hexahydrophthalic anhydride, followed by dehydrative condensation at 240° C. Thereafter, 61 g of trimellitic anhydride was added thereto and was subjected to the reaction, and then 120 g of propylene glycol monopropyl ether and 300 g of propylene glycol monomethyl ether was further added to obtain a polyol (D-5) solution. The hydroxyl value of the polyol (D-5) was found to be about 80 mg KOH/g, the acid value was found to be about 30 mg KOH/g, and the number-average molecular weight was found to be about 2500.

Example 11

A thermosetting composition was prepared by mixing with stirring 60 parts of the above blocked isocyanate group-containing resin (C-1) solution as a curing agent component, 100 parts of the polyol (D-1) solution as a base resin component, and 40 parts of isopropanol. Examples 12 to 18 and Comparative Examples 4 to 13 Each thermosetting composition was prepared in a similar manner to Example 11 with the exception that each mixing composition as shown in Table 1 or 2 was used in Example 11.

Comparative Example 14

A thermosetting aqueous composition was prepared by mixing with stirring 35 parts of the above blocked isocyanate group-containing resin (C-4) solution as a curing agent component, 100 parts of the polyol (D-3) solution as a base resin component, and 5.5 parts of dimethylaminoethanol, then adding 100 parts of deionized water, and further mixing with stirring the whole.

Example 19

A thermosetting aqueous composition showing pH of 8.5 was prepared by mixing with stirring 46 parts of the above blocked isocyanate group-containing resin (C-6) solution as a curing agent component, 100 parts of the polyol (D-5) solution as a base resin component, and 3.4 parts of dimethylaminoethanol, then adding 128 parts of deionized water, further mixing with stirring the whole, and finally adding suitable amount of dimethylaminoethanol.

Examples 20 to 23 and Comparative Examples 15

Each thermosetting aqueous composition was prepared in a similar manner to Example 19 with the exception that each mixing composition as shown in Table 3 was used in Example 19.

Performance Test

Each thermosetting composition obtained as above was applied onto a tin plate by means of an applicator (400 μm) and was maintained at 100° C. for 30 minutes to obtain each coated film. Then, the condition of the resulting coated film was observed visually and, if it was good, curability thereof was further evaluated. The results were shown in Tables 1 to 3.

(*1) Condition of coated film: Evaluation standard is as follows.

O: Transparent and homogeneous x: Inhomogeneous or turbid owing to phase separation having an islands and see structure (*2) Curability: The coated film was dipped in acetone and boiled for 5 hours. Thereafter, the film was dried at 130° C. for 30 minutes and the amount of acetone-insoluble part was measured. Evaluation standard is as follows.

O: Acetone-insoluble part is 75% or more.

X: Acetone-insoluble part is less than 75%.

(*3) Viscosity stability during storage: Viscosity of each of the thermosetting aqueous compositions obtained in Examples 19 to 23 and Comparative Example 15 as above was measured and then, stored in a constant-temperature room of 30° C. under tightly sealed conditions for 1 week. Viscosity thereof was again measured and was compared with viscosity before storage, and thereby, viscosity stability during storage was evaluated by viscosity change rate R (%) shown by the following formula. Smaller R shows excellence of viscosity stability. Viscosity (Pa·s) was measured by means of "Vismetron viscometer" (manufactured by Toshiba System K.K.). Viscosity change rate R (%)=|{(Viscosity after storage/Viscosity before storage)−1}|×100

(Evaluation Standard)

O: $R \leq 5$

Δ: $5 < R \leq 10$

X: $10 < R$

TABLE 1

|  |  |  | Example | | | | | | | |
|---|---|---|---|---|---|---|---|---|---|---|
|  |  |  | 11 | 12 | 13 | 14 | 15 | 16 | 17 | 18 |
| Paint composition | Blocked isocyanate group-containing resin solution | (A-1) | | | | | | | | |
|  |  | (A-2) | | | | | | | | |
|  |  | (A-3) | | | | | | | | |
|  |  | (A-4) | | | | | | | | |
|  |  | (A-5) | | | | | | | | |
|  |  | (C-1) | 60 | | 65 | | | | | |
|  |  | (C-2) | | 60 | | 65 | | | | |
|  |  | (C-3) | | | | | 40 | 50 | | |
|  |  | (C-4) | | | | | | | 45 | |
|  |  | (C-5) | | | | | | | | 60 |

TABLE 1-continued

| | | Example | | | | | | | |
|---|---|---|---|---|---|---|---|---|---|
| | | 11 | 12 | 13 | 14 | 15 | 16 | 17 | 18 |
| | (C-11) | | | | | | | | |
| | (C-12) | | | | | | | | |
| Polyol solution | (D-1) | 100 | 100 | | | | | | 100 |
| | (D-2) | | | 100 | 100 | | | 100 | |
| | (D-3) | | | | | 100 | | 100 | |
| | (D-4) | | | | | | 100 | | |
| Isopropanol | | 40 | 40 | 40 | 40 | 40 | 40 | 40 | 40 |
| Dimethylaminoethanol | | | | | | | | | |
| Deionized water | | | | | | | | | |
| Condition of coated film | | ○ | ○ | ○ | ○ | ○ | ○ | ○ | ○ |
| Curability | | ○ | ○ | ○ | ○ | ○ | ○ | ○ | ○ |

TABLE 2

| | | | Comparative Example | | | | | | | | | | |
|---|---|---|---|---|---|---|---|---|---|---|---|---|---|
| | | | 4 | 5 | 6 | 7 | 8 | 9 | 10 | 11 | 12 | 13 | 14 |
| Paint composition | Blocked isocyanate group-containing resin solution | (A-1) | 60 | | | | 65 | | | | | | |
| | | (A-2) | | 60 | | | | 65 | | | | | |
| | | (A-3) | | | | | | | 40 | 50 | | | |
| | | (A-4) | | | | | | | | | 45 | | 35 |
| | | (A-5) | | | | | | | | | | 60 | |
| | | (C-1) | | | | | | | | | | | |
| | | (C-2) | | | | | | | | | | | |
| | | (C-3) | | | | | | | | | | | |
| | | (C-4) | | | | | | | | | | | |
| | | (C-5) | | | | | | | | | | | |
| | | (C-11) | | | 60 | | | | | | | | |
| | | (C-12) | | | | 65 | | | | | | | |
| Polyol solution | (D-1) | | 100 | 100 | 100 | | | | | | | 100 | |
| | (D-2) | | | | | 100 | 100 | 100 | | | | | |
| | (D-3) | | | | | | | | 100 | | 100 | | 100 |
| | (D-4) | | | | | | | | | 100 | | | |
| Isopropanol | | | 40 | 40 | 40 | 40 | 40 | 40 | 40 | 40 | 40 | 40 | |
| Dimethylaminoethanol | | | | | | | | | | | | | 5.5 |
| Deionized water | | | | | | | | | | | | | 100 |
| Condition of coated film | | | X | X | X | X | X | X | X | X | X | X | X |

TABLE 3

| | | | Example | | | | | Comparative Example |
|---|---|---|---|---|---|---|---|---|
| | | | 19 | 20 | 21 | 22 | 23 | 15 |
| Paint composition | Blocked isocyanate group-containing resin solution | (C-6) | 46 | | | | | |
| | | (C-7) | | 46 | | | | |
| | | (C-8) | | | 46 | | | |
| | | (C-9) | | | | 46 | | |
| | | (C-10) | | | | | 46 | |
| | | (C-13) | | | | | | 46 |
| Polyol solution | (D-5) | | 100 | 100 | 100 | 100 | 100 | 100 |
| Dimethylaminoethanol | | | 3.4 | 3.4 | 3.4 | 3.4 | 3.4 | 3.4 |
| Deionized water | | | 128 | 128 | 128 | 128 | 128 | 128 |
| Condition of coated film | | | ○ | ○ | ○ | ○ | ○ | X |
| Curability | | | ○ | ○ | ○ | ○ | ○ | — |
| Viscosity stability during storage | | | ○ | ○ | ○ | X | X | X |

In the present invention, a resin (A) is modified with a monohydric alcohol (B). At that time, by selecting a suitable monohydric alcohol depending on the system, a resin (C) having a solubility parameter value lower than that of the original resin (A) before the modification. The resin (C) is capable of storing without problems such as crystallization and serves an excellent effect that the compatibility with common base resins for paint is remarkably improved. Scientific reasons for the improvement of the compatibility are not thoroughly clear, but the improvement is derived from not only the decrease of solubility parameter. The exchange of the alkoxy group part derived from the active methylene compound contained in the blocked isocyanate group in the resin (A) with the alkoxy group part of the monohydric alcohol (B) suitably selected depending on a base resin is accelerated by the operation of heating or vacuuming and the modification of the resin (A) derived from the exchange is one cause of the effect.

Moreover, in the case of using the resin (C) in an aqueous composition, viscosity stability during storage can be assured by selecting a suitable monohydric alcohol.

The one-pack type thermosetting composition containing the resin (C) thus obtained as a curing agent serves an effect that a coated film excellent in curability at a low temperature can be formed without problems such as tic phase separation from a base resin component.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

The disclosure of Japanese Patent Application No. 2001-368312 filed Dec. 3, 2001 including specification, drawings and claims is incorporated herein by reference in its entirety.

What is claimed is:

1. A blocked isocyanate group-containing resin composition, comprising a resin (C) obtainable by modifying a resin (A) having, in one molecule, two or more blocked isocyanate groups represented by formula (I) or (II):

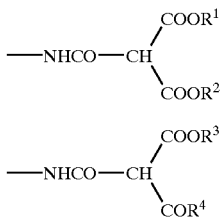

where $R^1$, $R^2$, $R^3$, and $R^4$, which are same or different, each represents a substituent having 1 to 10 carbon atoms, with a monohydric alcohol (B), where (B) is one or more compounds selected from the group consisting of mono (or oligo)propylene glycol monoalkyl ethers having 4 to 10 carbon atoms, and mono (or oligo)ethylene glycol monoalkyl ethers having 4 to 10 carbon atoms, replacing at least one of the $R^1$, $R^2$, and $R^3$;

wherein the resin (C) has a lowered solubility parameter as compared with the resin.

2. The blocked isocyanate group-containing resin composition according to claim 1, wherein the resin (A) is obtained by reacting the isocyanate groups in a polyisocyanate compound (a) having at least two isocyanate groups in one molecule with an active methylene compound (b).

3. The blocked isocyanate group-containing resin composition according to claim 2, wherein part of the isocyanate groups in the polyisocyanate compound (a) is reacted with a monohydric alcohol.

4. The blocked isocyanate group-containing resin composition according to claim 1, wherein the resin (A) is obtainable by homopolymerizing a first vinyl monomer containing a blocked isocyanate group represented by the formula (I) or (II):

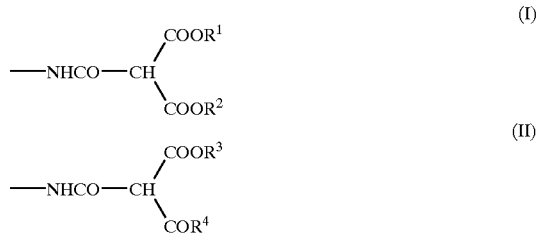

or copolymerizing the first vinyl monomer with a second vinyl monomer.

5. The blocked isocyanate group-containing resin composition according to claim 1, wherein the amount of the monohydric alcohol (B) to be used for modification of the resin (A) is from 5 to 500 parts by weight relative to 100 parts by weight of solid content of the resin (A).

6. The blocked isocyanate group-containing resin composition according to claim 1, wherein the resin (C) is obtainable by removing part or all of the alcohol derived from at least one selected from the $R^1$, $R^2$, and $R^3$ in the blocked isocyanate groups in the resin (A).

7. The blocked isocyanate group-containing resin composition according to claim 6, wherein part or all of the alcohol derived from at least one selected from the $R^1$, $R^2$, and $R^3$ in the blocked isocyanate groups in the resin (A) is removed by heating and vacuuming operation.

8. The blocked isocyanate group-containing resin composition according to claim 1, wherein the resin (C) has a number-average molecular weight of 600 to 30000 and a solubility parameter value of 8.0 to 11.0.

9. A thermosetting composition comprising the blocked isocyanate group-containing resin composition according to claim 1 and a polyol (D).

10. The thermosetting composition according to claim 9, wherein the polyol (D) has a number-average molecular weight of 1000 to 80000 and a hydroxyl value of 5 to 220 mg KOH/g.

11. The thermosetting composition according to claim 9, wherein the using weight:weight ratio of the resin (C) to the polyol (D) is from 1:0.5 to 1:20 based on both components.

* * * * *